March 24, 1936.  W. E. WILCOX  2,034,786

CHECK VALVE

Filed June 28, 1934

INVENTOR
Walter E. Wilcox.
By Rodney Bedell
ATTORNEY

Patented Mar. 24, 1936

2,034,786

UNITED STATES PATENT OFFICE 2,034,786

CHECK VALVE

Walter E. Wilcox, Roanoke, Va.

Application June 28, 1934, Serial No. 732,748

5 Claims. (Cl. 277—70)

The invention relates to check valves of the type which are used where a chamber or passage containing fluid under pressure has injected thereinto additional fluid, the pressure on which at the moment of injection must exceed the pressure in the receiving chamber or passage.

A particular field of use for the invention as illustrated and described herein is in connection with lubricating the pistons and steam valves of steam locomotives or other steam engines.

Check valve devices of this type usually include a needle, or pin, normally held against a seat by a heavy spring working in opposition to the steam pressure. A flexible diaphragm extends across the valve chamber and is subject on one side to pressure of the steam in the cylinder or its supply valve and is subject on the other side to pressure in the lubricant supply line. When the first-mentioned pressure exceeds the second-mentioned pressure, the valve is closed and when the ratio of pressures is reversed, the valve is opened.

When the check valve is applied, its spring pressure must be carefully adjusted in accordance with the operating pressures of the lubricant pump and steam cylinder.

The continual opening and closing, or fluttering, of the valve results in a short life for the diaphragm and the repeated seating of the valve stem under the high pressure applied thereto rapidly wears the end of the stem or its seat, or both, lessening the spring tension and thereby interfering with the original valve spring adjustment. Also any scratch or other minute injury to the stem or seat resulting in leakage is gradually enlarged by the passage of steam therethrough, allowing the steam to escape to the oil line, which is highly objectionable.

Since the check valve spring must overcome the maximum steam pressure, it follows that the pressure on the oil supply line must build up to a higher degree than the maximum steam pressure, otherwise the valve would never be opened to admit oil to the cylinder. Hence the pump is likely to increase its pressure sufficiently to discharge oil into the cylinder at the time of maximum pressure therein, which tends to increase the possibility of steam escaping into the oil supply line and also increases the fluttering tendency of the valve because of the pulsations of the lubricant pump.

One of the objects of the present invention is to provide a simple, durable check valve, the working parts of which are readily accessible for inspection, repair, or replacement.

Another object is to eliminate the necessity of frequent repairs by avoiding the use of the diaphragm actuated valve member.

Another object is to avoid leakage by increasing the area of contact between the opposing valve and valve seat elements.

Another object is to utilize the high steam pressure to hold the valve closed whereby the steam valve is opened and oil admitted to the steam cylinder when the steam pressure therein is very low.

Another object is to eliminate the necessity of providing valves of different capacities for use with different steam operating pressures.

Another object is to avoid the use of a heavy spring for seating the valve and thereby to reduce the pressure which must be maintained on the lubricant supply in order to unseat the valve.

Another object is to provide an adequate dirt and sediment collecting chamber in a small-sized check valve.

These and other detail objects are attained in applicant's invention which includes a lubricant passage with successive valve elements which may be held closed by the pressure in the discharge end of the assembly and may be opened by relatively light pressure on the lubricant in the supply end of the assembly.

In the accompanying drawing illustrating the invention—

Figure 1:
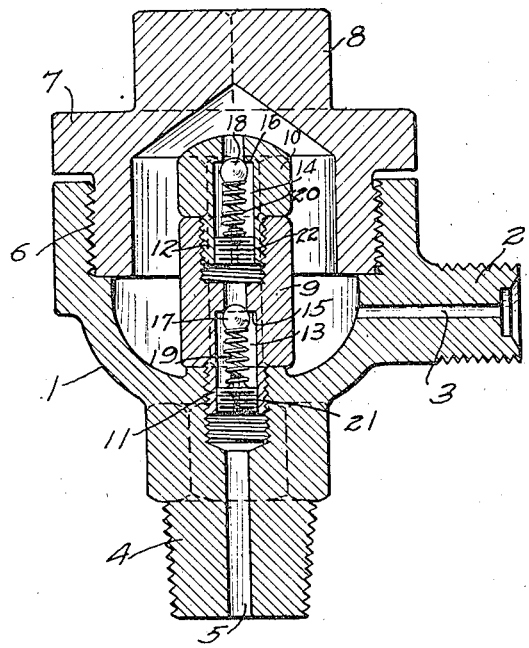
Figure 1 is a section through the center of a check valve device illustrating one form of the invention.

The device shown in Figure 1 includes a hollowed or chambered body 1 having a nipple 2 projecting laterally therefrom and threaded for coupling the same to a supply of lubricant (not shown) and having a lubricant inlet orifice 3 communicating with the interior of the body. Projecting downwardly is another nipple 4 threaded for attachment to the steam cylinder or valve chamber to be lubricated, or to a pipe leading thereto and having a lubricant outlet orifice 5. The body 1 is interiorly threaded at 6 for attachment of a hollowed cap 7 which forms a portion of and closes the body chamber. The body chamber may be of any suitable shape but is preferably generally cylindrical, as shown. Cap 7 is provided with an angular gripping enlargement 8 for manipulation by a wrench and may be removed easily, without affecting nipples 2 and 4, for access to the body chamber for inspection or renewal of enclosed parts.

Projecting from the bottom wall of the body chamber is a finger-like structure formed of separately formed valve housings 9 and 10 having threaded bosses 11 and 12 for attachment respectively to the body and to the upper extremity of the housing 9. Housings 9 and 10 have aligned central passages 13 and 14 restricted at 15 and 16 to form valve seats. Ball valves 17 and 18 are normally held in engagement with these seats by coiled springs 19 and 20 seated against plugs 21 and 22 screwed into the bosses 11 and 12. These plugs are provided with slots for a screwdriver for their removal or to adjust the tension of springs 19 and 20. These springs are of relatively light construction exerting only sufficient pressure upon the balls to sustain the weight of the balls and overcome any vacuum created in the orifice 5. The plugs have axial openings to permit the flow of oil therethrough.

With this construction the pressure on the outlet side of the device tends to seat balls 17 and 18. When the pressure on the outlet side drops, or the pressure on the inlet side increases until the latter pressure exceeds the former, plus the tension of springs 19 and 20, the balls will unseat and oil will be fed through the device. When the excess of pressure is reversed, the balls will be seated, but usually not simultaneously and this seating movement will occur as the steam pressure in the cylinder begins to build up and long before the steam pressure approaches its maximum. The lag between the movement of the balls tends to eliminate the escape of steam through the finger-like structure. If there is a difference in the tension of the two springs 19 and 20, the lag between the movements of the balls may be increased. Irrespective of this feature and irrespective of the number of balls used, as a result of the gradual reversing of the predominant pressure in the device at comparatively low pressures per square inch, the column of oil within the finger-like structure serves as a buffer for the balls as they are seated, tending to eliminate the pounding of the ball against its seat. This tendency is increased if the lower spring 19 is lighter than the upper spring whereby the upper ball seats first and the oil within members 9 and 10 is trapped. The higher the steam pressure the more firmly the balls are held against their seat.

With the present device the lubricant pump needs to provide pressure only in excess of the resistance offered by springs 19 and 20 as each cycle of the steam cylinder is marked by a period when the pressure therein is reduced to atmospheric pressure, or less. With the old type of terminal check described in the introductory portion of the specification, special demands are made on the lubricant pump when the locomotive is drifting. With the present device the pump load is the same whether the locomotive is drifting or working under steam pressure. Not only is the seating of the balls a more gradual but positive operation than in the pin type valve, but the balls may rotate to an infinite number of positions and present different elements to the valve seat every time the valve opens and closes.

In addition, the passage between balls 17 and 18 serves as a trap for minute quantities of steam which may pass the lower ball and such quantities will condense in this trap and be forced out by the subsequent pumping operations.

Figure 2:
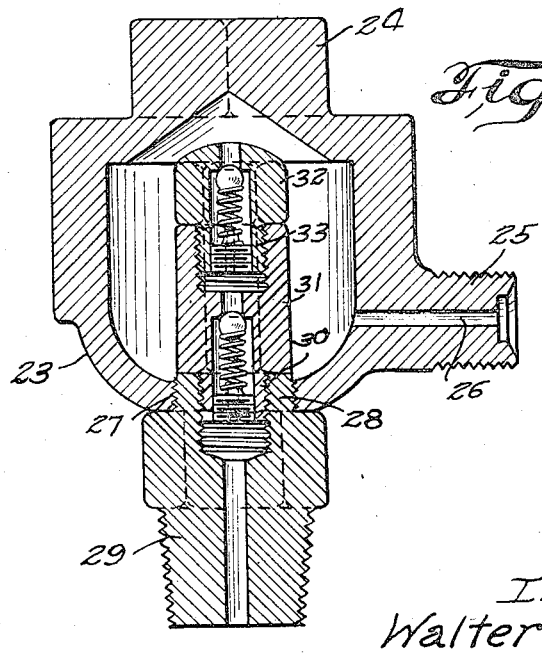
Figure 2 is a similar view showing a modification.

In Figure 2, the valve construction is similar to that in Figure 1 but the entire body 23, including the cap portion, is formed in one piece with an angular wrench enlargement 24 and a lateral projecting threaded coupling nipple 25 having an oil inlet orifice 26. The lower wall of the body is threaded at 27 to receive boss 28 on the oil outlet nipple 29. Boss 28 is interiorly threaded for receiving the boss 30 at the lower end of valve housing 31. The upper valve housing 32 is secured to the lower housing 31 as in the previous form by means of a threaded boss 33. In this form the inlet oil lead must be disconnected from the nipple 25 to permit removal of the body 23 for inspection, adjustment or repair of the valves.

In each form of the invention, a spacious chamber is provided within the body of the device for collecting dirt and sediment from the oil and the entrance to the restricted passage through the valve housing structure is substantially spaced from the chamber walls on all sides so that this entrance will not be obstructed by sediment irrespective of the position in which the device is used.

The usual working steam pressure in modern locomotive cylinders is approximately two hundred pounds to the square inch. With the use of the diaphragm needle valve type of terminal check referred to above, the valve spring must exert a pressure in excess of the steam pressure. Accordingly, oil pressure of from two hundred and ten to two hundred and thirty pounds per square inch must be maintained in the check in order to insure lubrication of the cylinder and its supply valve chambers. When the locomotive is drifting and there is a vacuum in the cylinder, even greater pressure would be required since the vacuum would further resist opening of the valve. With the use of the present invention oil pressure of approximately thirty-five pounds per square inch upon the ball valves has been used for lubricating the cylinder and locomotive valves. This novel check device will give good service for from six months to a year, whereas the needle valve check fittings at present in use must be repaired or renewed after from thirty to sixty days of use. The novel device is substantially more durable and less complicated and expensive in construction and operation than the needle valve check devices.

The structure of the accompanying drawing described above in detail is but one form of the invention which may be embodied in various installations where it is required to inject a fluid under pressure into a chamber also under pressure, and the fact that the pressure on the supply end of the device may have to exceed a high pressure on the inlet side of the device would not detract from the merits of the double check and cushioning features of the invention. More than two successive check valves may be used and the check valves need not consist of the spring pressed balls illustrated. Other details of the invention may be varied without departing from the spirit thereof and the exclusive use of all modifications coming within the scope of the appended claims is contemplated.

I claim:

1. In a device of the type described, a restricted fluid passage having a pair of valve seats disposed successively longitudinally thereof, ball valves associated with said seats for checking the flow of fluid in said passage in one direction only, and springs independently urging said valves against said seats, said springs being constructed and arranged so that the thrust against the ball first encountered by the fluid is greater than the thrust against the other ball.

2. In a device of the class described, a hollow body with an interiorly threaded recess in the wall thereof, a discharge orifice leading outwardly from said recess, a relatively small hollow housing threaded into said recess and having a through passage including spaced apart valve seats facing towards said orifice, balls of less diameter than the interior of said housing, and individual springs retained in said housing and thrusting said balls against said seats respectively, there being an inlet orifice to said body spaced from said outlet orifice and said housing, and a removable cover for said body spaced from said housing and inlet orifice.

3. A device as specified in claim 2 in which the housing is in two parts each having one of the valve seats and a hollow removable plug spaced therefrom and each part having one of the springs seated by said plug and each part having one of the balls between its spring and its valve seat.

4. In a device of the class described, a cup-shaped body having an inlet passage at one side near the bottom and having an outlet passage leading from the bottom, a conduit mounted on the inner bottom and projecting upwardly to a point near the top of said body and being substantially smaller in cross-section than said body, a plurality of check valves in said conduit, there being an inlet to said conduit at the top thereof only and a discharge from said conduit to said outlet passage.

5. In a device of the type described, a pair of valves disposed in succession along the path of the fluid and operable for checking the flow of fluid through the device in one direction only, said valves including means operating automatically to close the valve first encountered by the fluid before the other valve is closed, to trap a quantity of fluid between said valves to serve as a cushion against the closing of the second valve encountered by the fluid in its flow through the device.

WALTER E. WILCOX.